(12) United States Patent
Wei et al.

(10) Patent No.: US 9,537,434 B2
(45) Date of Patent: Jan. 3, 2017

(54) DC ELECTRIC FAN AND DRIVING SYSTEM THEREOF

(71) Applicant: Delta Electronics, Inc., Taoyuan (TW)

(72) Inventors: Chia-Pin Wei, Taoyuan (TW); Wei-Shuo Tseng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 14/698,336

(22) Filed: Apr. 28, 2015

(65) Prior Publication Data

US 2015/0244294 A1   Aug. 27, 2015

Related U.S. Application Data

(63) Continuation-in-part of application No. 13/274,806, filed on Oct. 17, 2011, now abandoned.

(30) Foreign Application Priority Data

Apr. 1, 2011  (TW) .............................. 100111456 A

(51) Int. Cl.
| | |
|---|---|
| *H02P 27/00* | (2006.01) |
| *H02P 6/00* | (2016.01) |
| *H02P 6/16* | (2016.01) |
| *F04D 25/06* | (2006.01) |
| *H02M 3/156* | (2006.01) |

(Continued)

(52) U.S. Cl.
CPC .............. *H02P 6/002* (2013.01); *F04D 25/06* (2013.01); *H02M 3/156* (2013.01); *H02M 3/33507* (2013.01); *H02M 3/33553* (2013.01); *H02M 3/33561* (2013.01); *H02P 6/16* (2013.01); *H02P 6/28* (2016.02); *H02M 2001/0006* (2013.01); *H02M 2001/009* (2013.01)

(58) Field of Classification Search
CPC ........... H02P 6/085; H02P 6/182; H02P 9/305; H02P 2207/05; H01M 10/441; H01M 10/44; H02H 3/087; H02M 3/1588; H02M 3/33507
USPC ...... 318/700, 400.21, 400.26, 400.3, 400.38, 318/722, 434
See application file for complete search history.

(56) References Cited

U.S. PATENT DOCUMENTS

| | | | |
|---|---|---|---|
| 4,234,834 A * | 11/1980 | Jennings | H02P 1/22 318/285 |
| 4,673,858 A * | 6/1987 | Saito | H02P 27/047 318/798 |

(Continued)

*Primary Examiner* — Bentsu Ro
*Assistant Examiner* — Thai Dinh
(74) *Attorney, Agent, or Firm* — Muncy, Geissler, Olds & Lowe, P.C.

(57) ABSTRACT

A DC electric fan receiving a first direct current voltage is provided. The DC electric fan includes a motor, a fan blade, a voltage converting device and a motor controller. The motor is directly driven by the first direct current voltage. The fan blade is connected to the motor and rotated by the driving of the motor. The voltage converting device receives and converts the first direct current voltages to a second direct current voltage, wherein the magnitude of the first direct current voltages is larger than the magnitude of the second direct current voltage. The motor controller receives the second direct current voltages to control a rotation direction of the motor, wherein the motor controller is not powered by the first direct current voltage and the first direct current voltage is a fixed direct current voltage.

17 Claims, 8 Drawing Sheets

(51) Int. Cl.
*H02M 3/335* (2006.01)
*H02M 1/00* (2006.01)

(56) References Cited

U.S. PATENT DOCUMENTS

| | | | |
|---|---|---|---|
| 6,239,566 B1 | 5/2001 | Tareilus et al. | |
| 6,278,248 B1 * | 8/2001 | Hong | H02K 29/08 310/63 |
| 6,693,407 B2 * | 2/2004 | Atmur | H02P 6/10 318/139 |
| 6,949,899 B2 * | 9/2005 | Horng | H02P 6/002 318/400.3 |
| 7,211,977 B2 | 5/2007 | Squibb | |
| 7,262,568 B2 * | 8/2007 | Takada | H02P 6/10 318/400.3 |
| 7,282,888 B2 | 10/2007 | Hsieh | |
| 7,675,256 B2 * | 3/2010 | Peng | H02P 6/00 318/254.1 |
| 7,847,511 B2 | 12/2010 | Yoo et al. | |
| 2002/0043946 A1 * | 4/2002 | Yoshimura | H02P 6/24 318/139 |
| 2004/0135537 A1 | 7/2004 | Conner et al. | |
| 2011/0203779 A1 * | 8/2011 | Dawes | F25B 49/005 165/121 |

\* cited by examiner

DC ELECTRIC FAN AND DRIVING SYSTEM THEREOF

CROSS REFERENCE TO RELATED APPLICATIONS

This application is a Continuation-In-Part of pending U.S. patent application Ser. No. 13/274,806, filed Oct. 17, 2011 and entitled "DC ELECTRIC FAN AND DRIVING SYSTEM THEREOF". In addition, this Application claims priority of Taiwan Patent Application No. 100111456, filed on Apr. 1, 2011, the entirety of which is incorporated by reference herein.

BACKGROUND OF THE INVENTION

Field of the Invention

The present invention relates to a direct current fan, and in particular relates to a direct current fan that can be directly driven by high direct current voltage.

Description of the Related Art

The operation voltage of the electrical fan is typically not high, and the most commonly used operation voltage may be 5V, 12V, 24V or 48V. However, the commercial power system provides an alternating current (AC) voltage and the magnitude of the AC voltage is between 110V and 220V, wherein a power supply is required to transform the AC voltage into a low DC voltage. Please refer to FIG. 1, wherein FIG. 1 is a schematic diagram of a conventional DC fan and a power supply. The power supply 11 receives the AC voltage $V_{ac}$ and outputs a second DC voltage $V_{dcL}$ to drive the DC fan 12. The power supply 11 comprises an EMI (Electromagnetic Interference) filter 13, a PFC (power factor correction stage) stage 14, and a DC/DC converter 14. The EMI filter 13 filters out noises of the input AC voltage. The PFC stage 14 transforms the filtered AC voltage into a first DC voltage $V_{dcH}$. The DC/DC converter 15 converts the first DC voltage $V_{dcH}$ to the second DC voltage $V_{dcL}$, wherein the magnitude of the second DC voltage $V_{dcL}$ is smaller than the magnitude of the first DC voltage $V_{dcH}$.

However, due to the design limitation of the conventional DC fan, the conventional DC fan may operate at a high current and low voltage level, which easily causes transmission loss. Also, under this circumstance, when the power supply executes the voltage transformation operation, it may also cause a power loss. Thus, the control mechanism of the conventional DC fan easily causes undesired waste of resources?.

BRIEF SUMMARY OF THE INVENTION

One object of an embodiment of the invention is to reduce the undesired waste of energy caused by the DC fan.

An embodiment of the invention provides a DC electric fan receiving a first direct current voltage. The DC electric fan comprises a motor, a fan blade, a voltage converting device and a motor controller. The motor is directly driven by the first direct current voltage. The fan blade is connected to the motor and rotated by the driving of the motor. The voltage converting device receives and converts the first direct current voltages to a second direct current voltage, wherein the magnitude of the first direct current voltages is larger than the magnitude of the second direct current voltage. The motor controller receives the second direct current voltages to control a rotation of direction the motor, wherein the motor controller is not powered by the first direct current voltage and the first direct current voltage is a fixed direct current voltage.

Another embodiment of the invention provides a DC electric fan driving system comprising a first voltage converter and a DC electric fan. The first voltage converter provides a first direct current voltage. The DC electric fan comprises a motor, a fan blade, a voltage converting device and a motor controller. The motor is directly driven by the first direct current voltage. The fan blade is connected to the motor and rotated by the driving of the motor. The voltage converting device receives and converts the first direct current voltages to a second direct current voltage, wherein the magnitude of the first direct current voltages is larger than the magnitude of the second direct current voltage. The motor controller receives the second direct current voltages to control a rotation of direction the motor, wherein the motor controller is not powered by the first direct current voltage and the first direct current voltage is a fixed direct current voltage.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
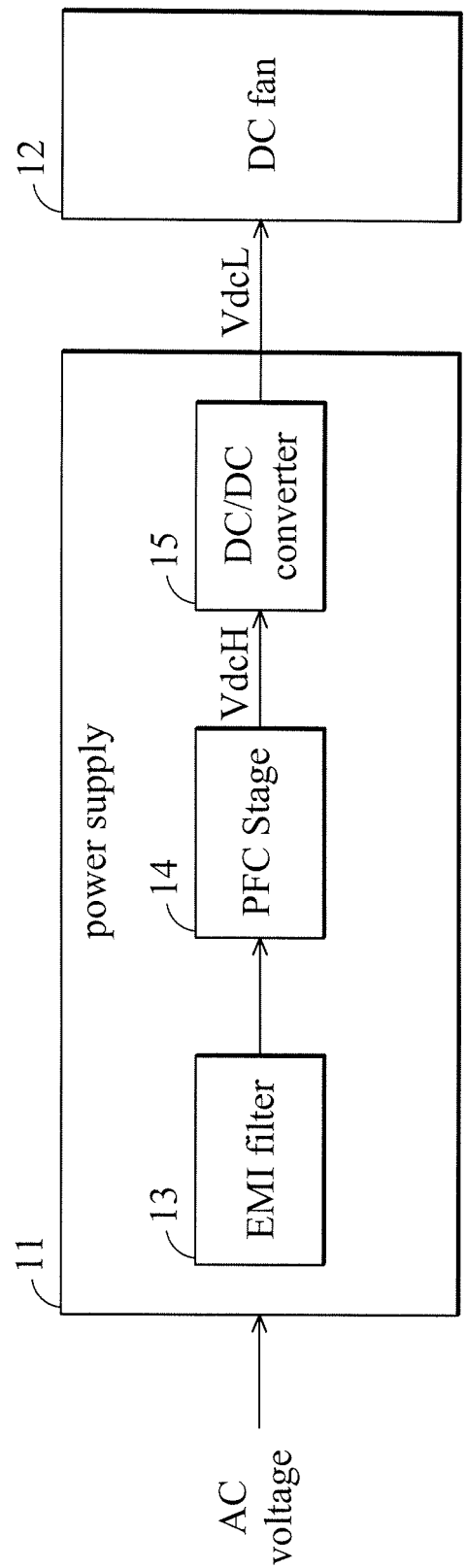
FIG. 1 is a schematic diagram of a conventional DC fan and a power supply.
Figure 2:
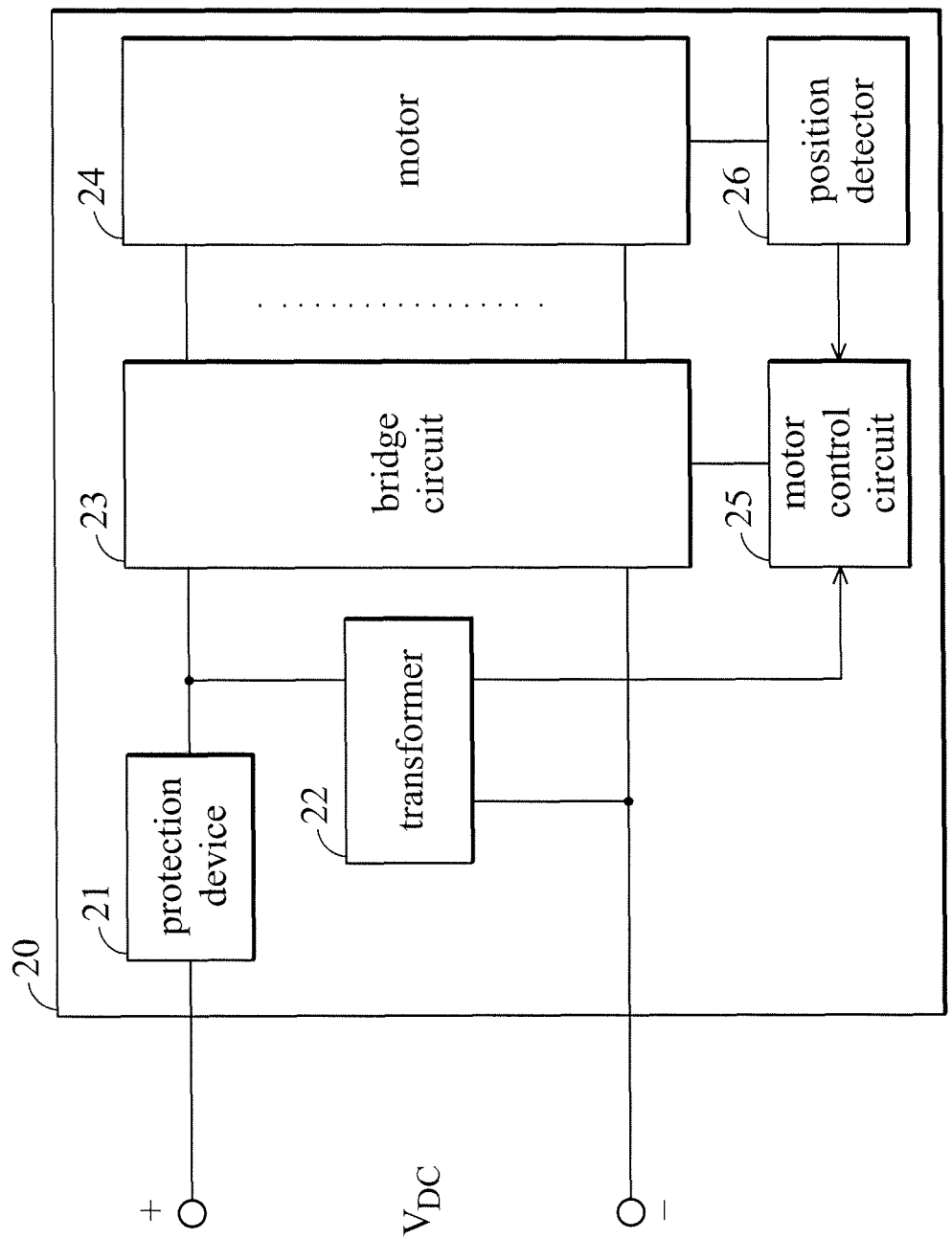
FIG. 2 is a schematic diagram of a DC electric fan according to an embodiment of the invention.

FIG. 2 is a schematic diagram of a DC electric fan according to an embodiment of the invention. The DC electric fan 20 receives a first DC voltage $V_{DC}$ and is driven by the first DC voltage $V_{DC}$. The DC electric fan 20 comprises a protection device 21, a transformer (or so-called voltage converter or voltage converting device) 22, a bridge circuit 23, a motor 24, a motor control circuit (or motor controller) 25 and a position detector 26. The motor 24 connects to a fan blade (not shown in FIG. 2), and the fan blade is rotated by the driving of the motor 24. The motor 24 of the DC electric fan 20 is directly driven by the first DC voltage $V_{DC}$, but the motor control circuit 25 and the position detector 26 cannot bear the magnitude of the first DC voltage $V_{DC}$. In other words, if the motor control circuit 25 and the position detector 26 directly receive the first DC voltage $V_{DC}$, the motor control circuit 25 and the position detector 26 will breakdown. In this embodiment, the magnitude of the first DC voltage $V_{DC}$ is substantially between 300V and 1000V. Since the first DC voltage $V_{DC}$ cannot directly drive the motor control circuit 25 and the position detector 26, the transformer 22 is required to receive and transform the first DC voltage $V_{DC}$ into a second DC voltage, wherein the magnitude of the first direct current voltages is larger than the magnitude of the second direct current voltage. Thus, the transformer 22 outputs the second DC voltage according to the operation voltage of the motor control circuit 25 and the position detector 26. The transformer 22 can also provide different DC voltages to different elements (not shown in FIG. 2) of the DC electric fan 20, but the motor 24 can only receive and be driven by the first DC voltage $V_{DC}$. In this embodiment, the magnitude of the second DC voltage is smaller than 48V.

In FIG. 2, compared with the conventional driving mechanism, wherein the DC electric fan 20 and the motor 24 are driven by low DC voltages, the energy loss during the operation of the DC fan and the voltage transformation can be significantly reduced when the DC electric fan 20 is directly driven by the first DC voltage $V_{DC}$. Meanwhile, another transformer may be required to provide operation voltage to elements or circuits of the DC electric fan 20, wherein the DC electric fan 20 and the motor 24 are controlled by the elements or circuits.

The first DC voltage $V_{DC}$ is input to the DC electric fan 20 via a positive terminal (labeled as "+" in FIG. 2) and a negative terminal (labeled as "−" in FIG. 2). The positive terminal is coupled to a protection device 21 to protect the circuit inside the DC electric fan 20. The protection device 21 prevents breakdown of the circuit inside the DC electric fan 20 due to the extremely high DC voltage input to the DC electric fan 20. In this embodiment, the labeled maximum breakdown voltage of the motor 24 is 1000V, but the actual maximum breakdown voltage of the motor 24 may be 1200V. To protect the motor 24, the protection device 21 is embedded in the DC electric fan 20. When the DC voltage $V_{DC}$ is larger than 1000V, the protection device 21 breaks down, and thus the DC voltage $V_{DC}$ cannot be input to the DC electric fan 20. Moreover, the maximum voltage that can be passed through the protection device 21 can be determined according to the actual maximum breakdown voltage of the motor 24, such as 1200V. In other words, the protection device 21 may breakdown when the DC voltage $V_{DC}$ is between 1000V and 1200V. In this embodiment, the protection device 21 may be a fuse, a transient voltage suppressor, or a thermal resistor.

The position detector 26 detects the locations of the rotors of the motor 24, transforms the locations into a location signal and transmits the location signal to the motor controller 25. The motor controller 25 controls the bridge circuit 23 according to the location signal to control the rotation direction of the motor 24. The position detector 26 comprises a Hall element, and the bridge circuit 23 is a full bridge circuit. In another embodiment, the position detector 26 can be implemented by an optical encoder or a sensor that can sense a winding voltage or a winding current of at least one rotor of the motor 24.

Figure 3:
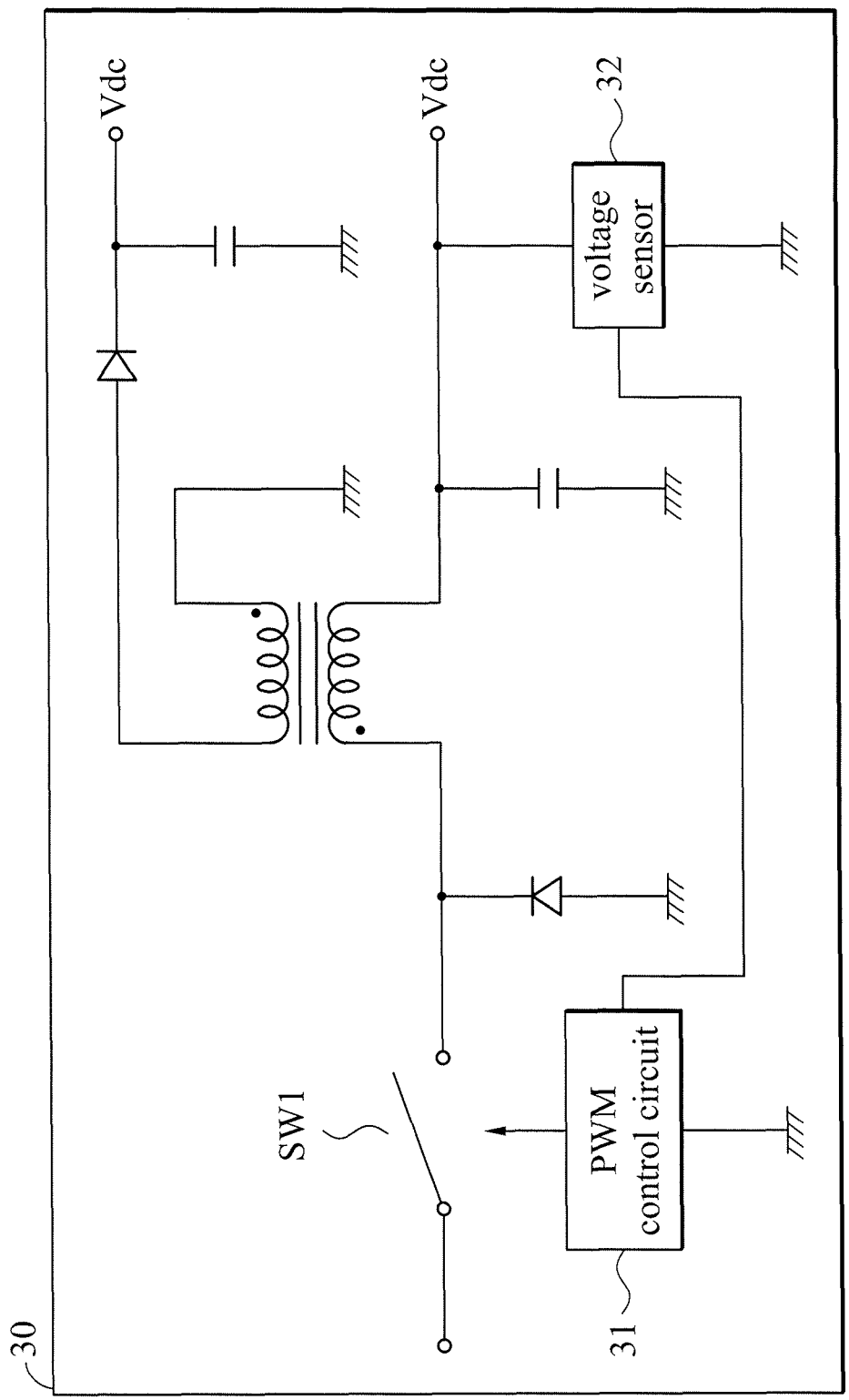
FIG. 3 is a schematic diagram of an embodiment of the transformer according to the invention.

FIG. 3 is a schematic diagram of an embodiment of the transformer according to the invention. The transformer 30 is a BUCK converter. The voltage sensor 32 transmits the sensing voltage value to the PWM (pulse width modulation) control circuit 31. The PWM control circuit 31 controls the switch SW1 to make the transformer 30 outputting the DC voltage $V_{dc}$ according to the sensing voltage value.

Figure 4:
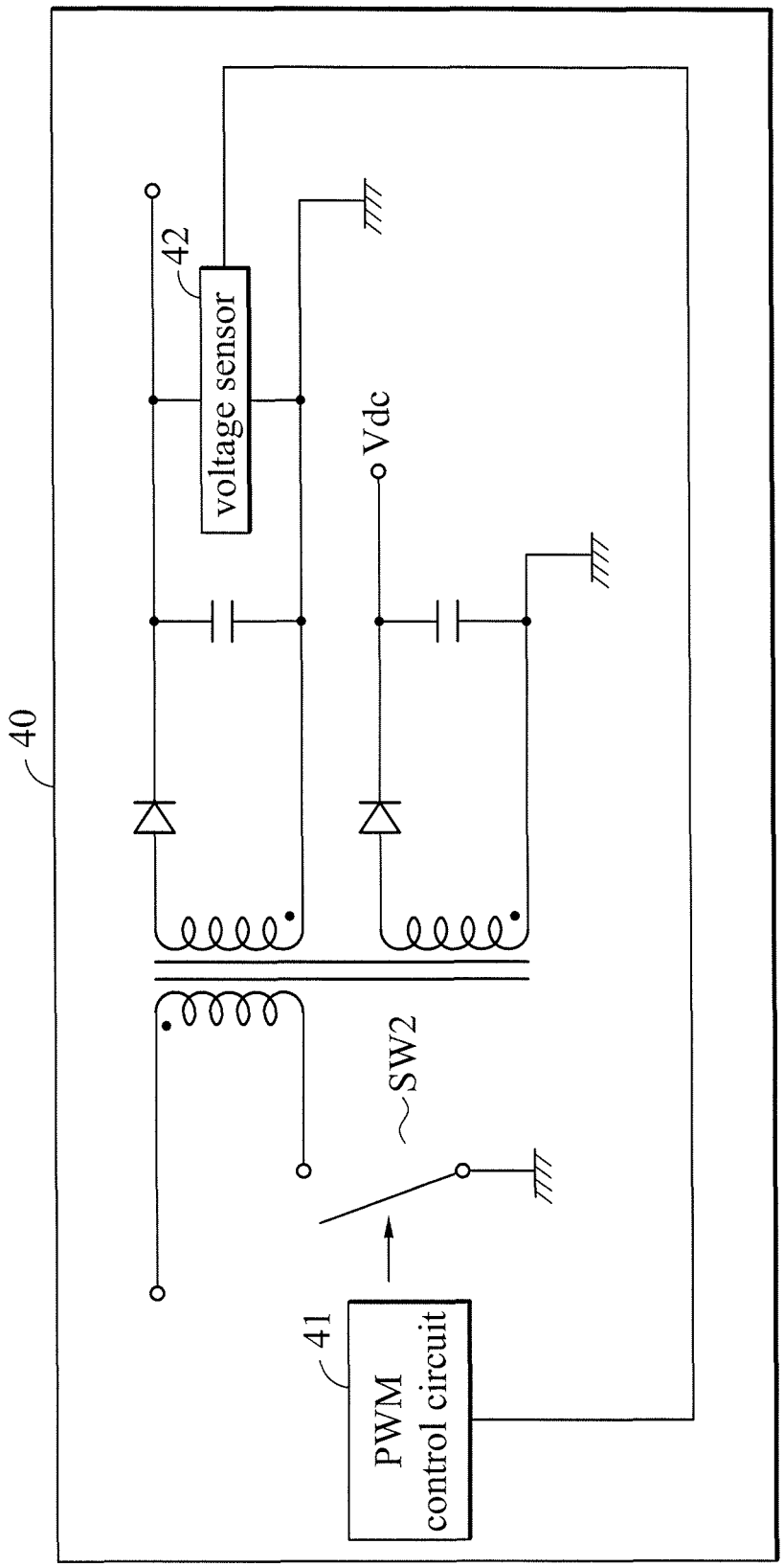
FIG. 4 is a schematic diagram of another embodiment of the transformer according to the invention.

FIG. 4 is a schematic diagram of another embodiment of the transformer according to the invention. The transformer 40 is a Flyback converter. The Flyback converter has the advantages of having a low cost, low circuit complexity and the ability to output multiple output voltages and is suited to be applied in the DC electric fan of the present disclosure. The voltage sensor 42 transmits the sensing voltage value to the PWM (pulse width modulation) control circuit 41. The PWM control circuit 41 controls the switch SW2 to make the transformer 40 output the DC voltage $V_{dc}$ according to the sensing voltage value. The voltage-converting element of the transformer 40 transfers and adjusts the energy between the input terminal and the output terminal, and the rectifier is the energy-releasing loop of the transformer 40.

Figure 5:
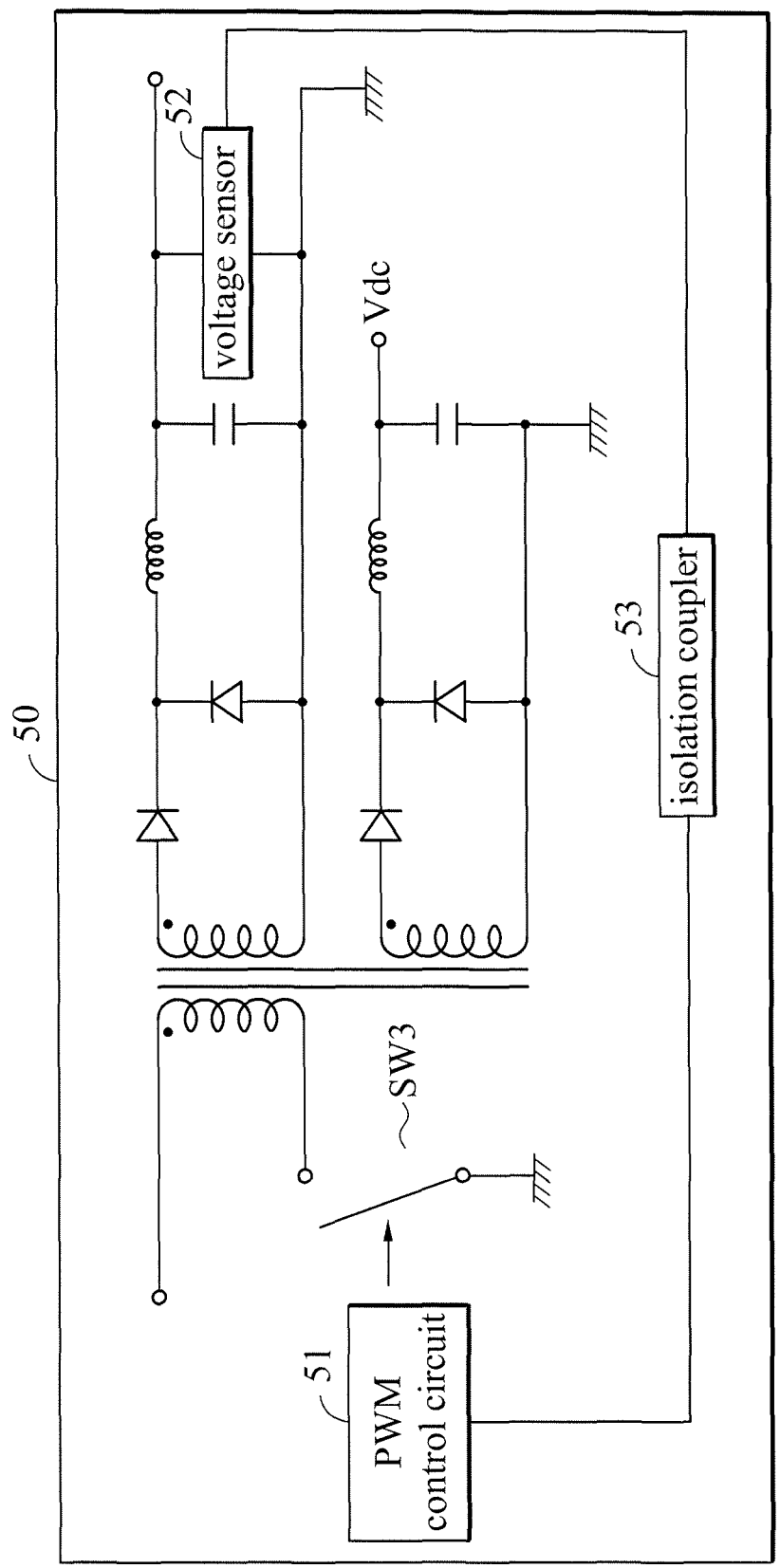
FIG. 5 is a schematic diagram of another embodiment of the transformer according to the invention.

FIG. 5 is a schematic diagram of another embodiment of the transformer according to the invention. The transformer 50 is a forward converter. Since the input DC voltage only passes through the transformer, a small sized transformer can be applied. The forward converter is commonly used for low output voltage and high output current; thus, the forward converter can be applied to the DC electric fan of the present disclosure.

The voltage sensor 52 transmits the sensing voltage value to the PWM (pulse width modulation) control circuit 41 directly or via an isolation coupler 53. The PWM control circuit 51 controls the switch SW3 to make the transformer 50 output the DC voltage $V_{dc}$ according to the sensing voltage value. The voltage-converting element of the transformer 50 transfers and adjusts the energy between the input terminal and the output terminal, and the rectifier is the energy-releasing loop of the transformer 50.

Figure 6:
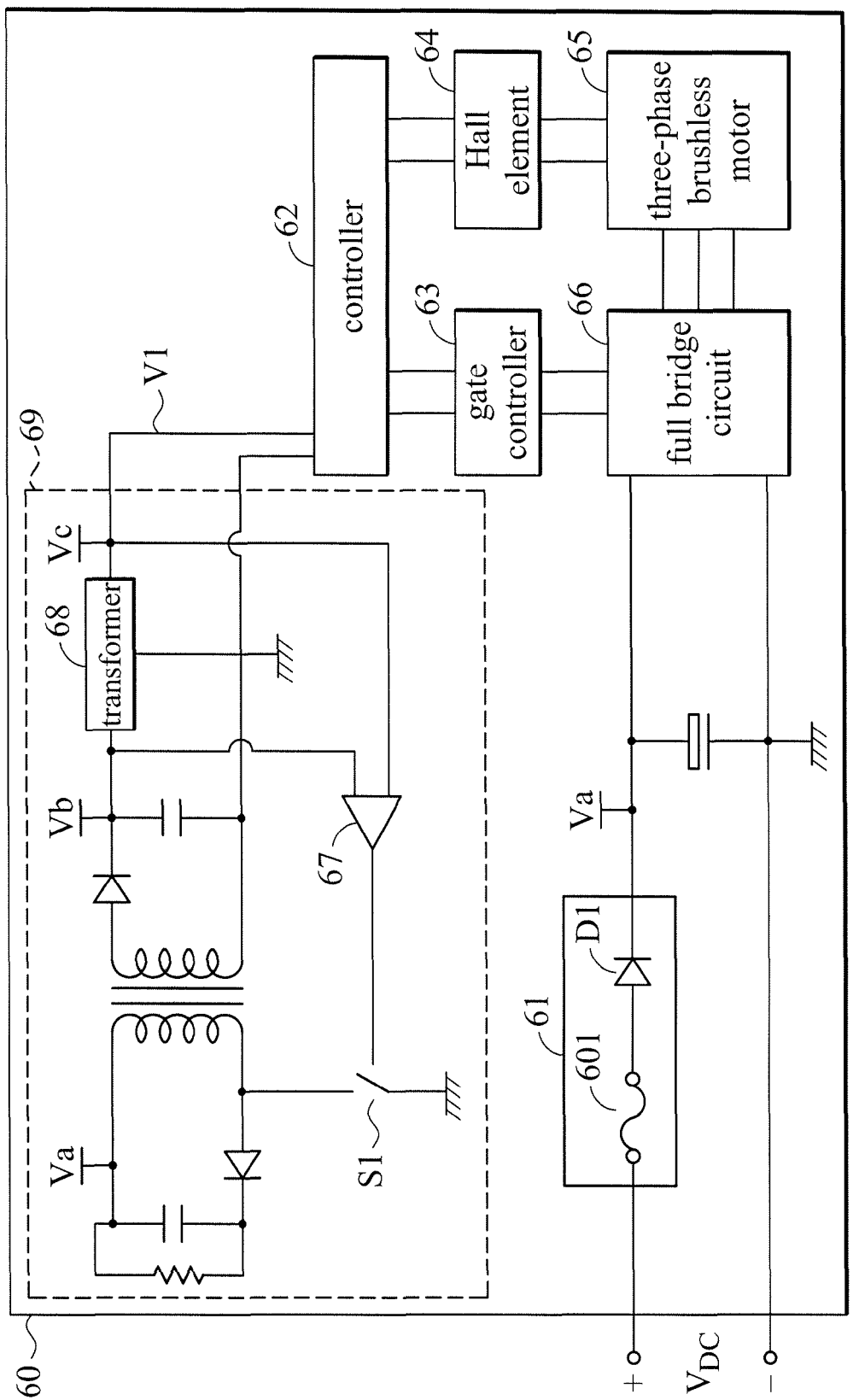
FIG. 6 is a schematic diagram of a DC electric fan according to another embodiment of the invention.

FIG. 6 is a schematic diagram of a DC electric fan according to another embodiment of the invention. The DC electric fan 60 comprises a protection device 61, a controller 62, a gate controller 63, a Hall element 64, a three-phase brushless motor 65, a full bridge circuit 66 and a voltage converting device 69. The protection device 61 comprises a fuse 601 and a diode D1 to prevent the circuit of the DC electric fan 60 from breaking down due to excessive DC voltage or current. The fuse 601 has an allowable voltage level, and when the DC voltage input to the DC electric fan 60 is higher than the allowable voltage level, the fuse 601 breaks down and the input DC voltage cannot transmit the DC voltage to the full bridge circuit 66 and the voltage converting device 69. The allowable voltage level is determined according to the allowable voltage levels of the full bridge circuit 66 and the voltage converting device 69.

The voltage converting device 69 receives the DC voltage Va and outputs a DC voltage V1 to the controller 62. The comparator 67 compares the voltage Vb input to the transformer 68 and the voltage Vc output by the transformer 68, and controls the switch S1 to be turned on or turned off according to the comparison result. The Hall element 64 detects the locations of the rotors of the three-phase brushless motor 65, transforms the positions into a position signal and then transmits the position signal to the controller 62. The controller then generates and transmits a control signal to the gate controller 63 to control the full bridge circuit 66. The full bridge circuit 66 controls the rotation direction of the three-phase brushless motor 65. In another embodiment, the full bridge circuit 66 can be replaced by a half bridge circuit.

Figure 7:
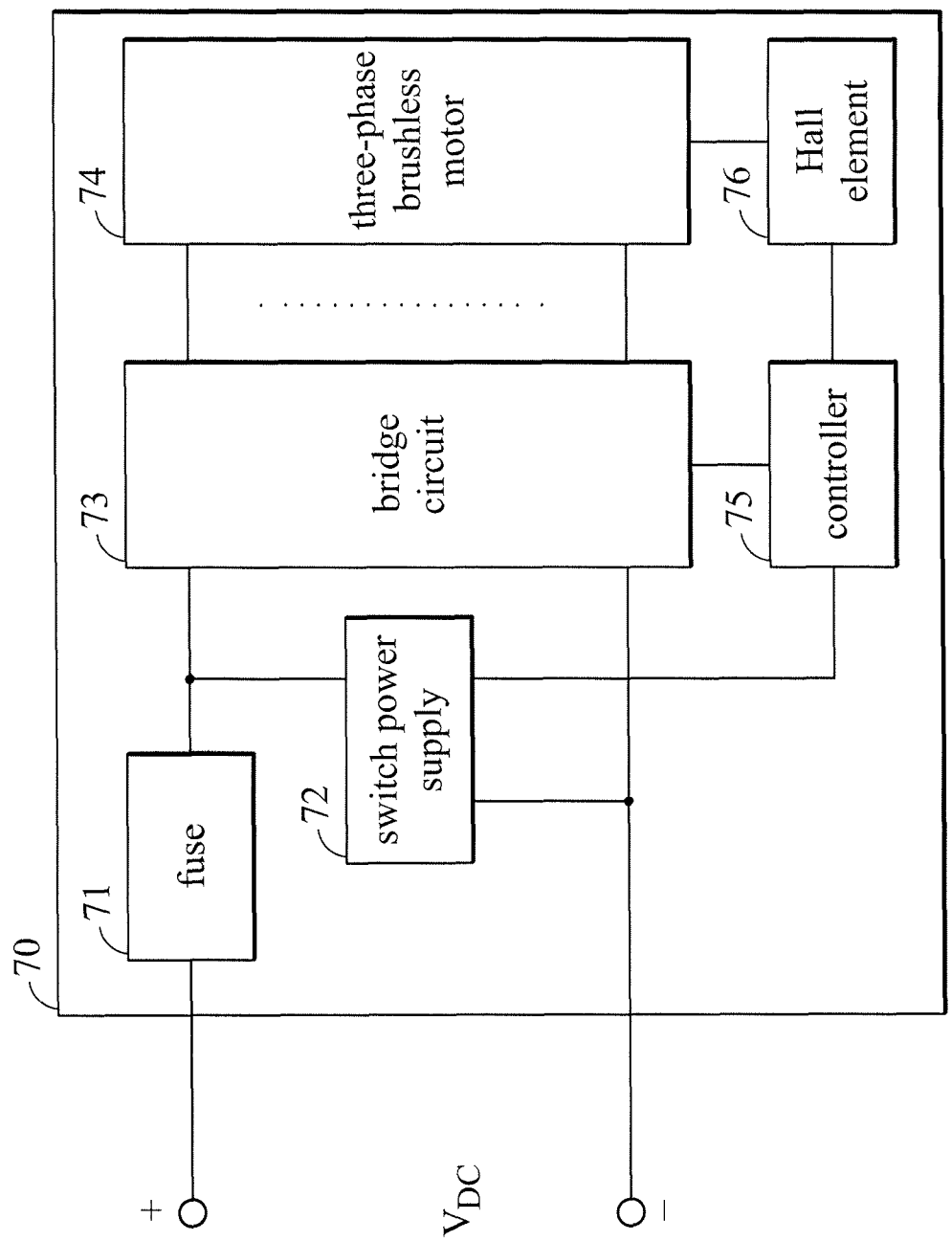
FIG. 7 is a schematic diagram of a DC electric fan according to another embodiment of the invention.

FIG. 7 is a schematic diagram of a DC electric fan according to another embodiment of the invention. The DC electric fan 70 receives and is driven by a first DC voltage $V_{DC}$. The DC electric fan 70 comprises a fuse 71, a switch power supply 72, a bridge circuit 73, a three-phase brushless motor 74, a controller 75 and a Hall element 76. The first DC voltage $V_{DC}$ can directly drive the three-phase brushless motor 74 of the DC electric fan 70, but the first DC voltage $V_{DC}$ cannot directly drive the controller 75 and the Hall element 76. Thus, a switch power supply 72 is applied to receive and convert the first DC voltage $V_{DC}$ to a second DC voltage according to the operation voltage of the controller 75 and the Hall element 76. The switch power supply 72 can output different voltages to different elements or circuits according to the operation voltage of the elements or circuits, but the three-phase brushless motor 74 can only be driven by the first DC voltage $V_{DC}$. The Hall element 76 detects positions of three rotors of the three-phase brushless motor 74, transforms the positions into a position signal, and transmits the position signal to the controller 75. The controller 75 controls the bridge circuit 73 to control a rotation direction of the three-phase brushless motor 74.

The first DC voltage $V_{DC}$ is input to the DC electric fan 70 via a positive terminal (labeled as "+" in FIG. 7) and a negative terminal (labeled as "–" in FIG. 7). The positive terminal is coupled to a fuse 71 to protect the circuit inside the DC electric fan 70 from damage. The fuse 71 prevents breakdown of the circuit inside the DC electric fan 70 due to the extremely high DC voltage input to the DC electric fan 70. In this embodiment, the labeled allowable voltage of the motor 74 is 1000V, but the actual breakdown voltage of the motor 74 may be 1200V. To protect the motor 74, the fuse 71 is embedded in the DC electric fan 70. When the DC voltage $V_{DC}$ is larger than 1000V, the fuse 71 breaks down, and thus the DC voltage $V_{DC}$ cannot be input to the DC electric fan 70. Moreover, the maximum voltage that can be passed through the fuse 71 can be determined according to the actual breakdown voltage of the motor 74, such as 1200V. In other words, the fuse 71 may breakdown when the DC voltage $V_{DC}$ is between 1000V and 1200V.

Figure 8:
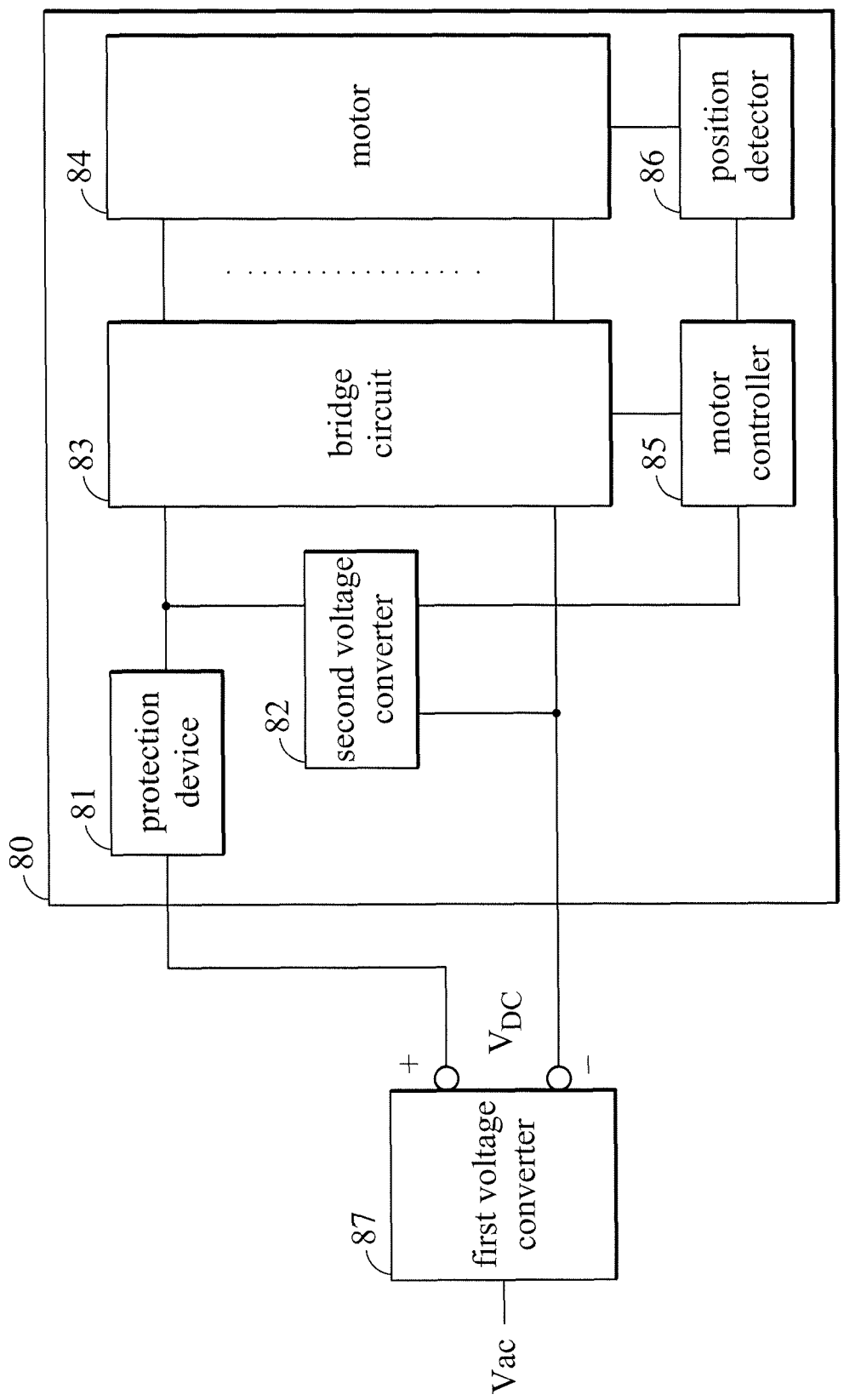
FIG. 8 is a schematic diagram of an embodiment of a fan driving system according to the invention.

FIG. 8 is a schematic diagram of an embodiment of a fan driving system according to the invention. The fan driving system comprises a first voltage converter 87 and a DC electric fan 80, wherein the first voltage converter 87 provides the DC electric fan 80 with a first DC voltage $V_{DC}$. The DC electric fan 80 receives and is driven by the first DC voltage $V_{DC}$. The DC electric fan 80 comprises a protection device 81, a second voltage converter 82, a bridge circuit 83, a motor 84, a motor controller 85 and a position detector 86. The motor 84 of the DC electric fan 80 can be directly driven by the first DC voltage $V_{DC}$, but the motor controller 85 and the position detector 86 cannot bear the first DC voltage $V_{DC}$. In this embodiment, the magnitude of the first DC voltage $V_{DC}$ is between 300V and 1000V; thus, the motor controller 85 and the position detector 86 cannot be directly driven by the first DC voltage $V_{DC}$. The second voltage converter 82 receives the first DC voltage $V_{DC}$ and outputs a second DC voltage according to the operation voltage of the controller 85 and the Hall element 86. The second voltage converter 82 can output different voltages according to the elements or circuits of the DC electric fan 80, but the motor 84 can only be driven by the first DC voltage $V_{DC}$.

The first DC voltage $V_{DC}$ is input to the DC electric fan 80 via a positive terminal (labeled as "+" in FIG. 7) and a negative terminal (labeled as "(" in FIG. 7). The positive terminal is coupled to a protection device 81 to protect the circuit inside the DC electric fan 80 from damage. The protection device 81 prevents breakdown of the circuit inside the DC electric fan 80 due to an extremely high DC voltage input to the DC electric fan 80. In this embodiment, the labeled allowable voltage of the motor 84 is 1000V, but the actual breakdown voltage of the motor 84 may be 1200V. To protect the motor 84, the protection device 81 is applied in the DC electric fan 80. When the first DC voltage VDC is larger than 1000V, the protection device 81 breaks down, and thus the first DC voltage VDC cannot be input to the DC electric fan 80. Moreover, the maximum voltage that can be passed through the protection device 81 can be determined according to the actual breakdown voltage of the motor 84, such as 1200V. Thus, the protection device 81 may breakdown when the first DC voltage VDC is between 1000V and 1200V.

The position detector 86 detects the locations of the rotors of the motor 84, transforms the locations into a location signal and transmits the location signal to the motor controller 85. The motor controller 85 controls the bridge circuit 83 according to the location signal to control the rotation direction of the motor 84. The position detector 86 comprises a Hall element, and the bridge circuit 83 is a full bridge circuit.

In an embodiment, the first DC voltage $V_{DC}$ provided to the DC electric fan can be provided by a battery, a battery system or power storage. In some embodiment, the first DC voltage $V_{DC}$ provided to the DC electric fan is a fixed direction current voltage, i.e., a direction current voltage with a fixed value.

In some embodiment, the motor 24 of the invention can be served as an induction motor. Specifically, when first DC voltage $V_{DC}$ is not provided to rotate the fan and the fan is rotated due to nature forces (such as wind power), an induced voltage (i.e., an electromotive force) would be generated by winds in the motor 24, the induced voltage is rectified by the bridge circuit 23 to a DC charging voltage, and the generated DC charging voltage can be used to charge a battery or power storage connected to the DC electric fan.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. A DC electric fan receiving a first direct current voltage, comprising:
  a motor directly driven by the first direct current voltage;
  a fan blade connected to the motor and rotated by the driving of the motor;
  a voltage converting device to receive and convert the first direct current voltages to a second direct current voltage, wherein the voltage converting device comprises a voltage sensor, a pulse width modulation control circuit and a switch, the voltage sensor transmits a sensing voltage value to the pulse width modulation control circuit, the pulse width modulation control circuit controls the switch to make the voltage converting device output the second direct current voltage according to the sensing voltage value, and the magnitude of the first direct current voltages is larger than the magnitude of the second direct current voltage; and
  a motor controller receiving the second direct current voltages to control a rotation direction of the motor, wherein the motor controller is not powered by the first direct current voltage and the first direct current voltage is a fixed direct current voltage.

2. The fan as claimed in claim 1, wherein the first direct current voltage is larger than 300V.

3. The fan as claimed in claim 1, wherein the first direct current voltage is larger than 300V and smaller than 1000V.

4. The fan as claimed in claim 1, wherein the first direct current voltage is provided by a battery system.

5. The fan as claimed in claim 1, further comprising a position detector to detect positions of rotors of the motor and transmit a position signal corresponding to the positions of the rotors to the motor controller.

6. The fan as claimed in claim 1, further comprising a bridge circuit controlled by the motor controller to control the rotation direction of the motor.

7. The fan as claimed in claim 1, further comprising a positive terminal and a negative terminal to receive the first direct current voltage, and a protection device coupled between the positive terminal and the negative terminal, wherein when the first direct current voltages is larger than a predetermined voltage, the protection device is shut down.

8. The fan as claimed in claim 1, wherein an induced voltage is generated by winds in the motor, the induced voltage is rectified to a direct current charging voltage to charge a battery or power storage connected to the DC electric fan, when the first direct current voltage is not provided to the DC electric fan and a fan driven by the motor is rotated due to nature forces.

9. The fan as claimed in claim 1, further comprising:
a position detector to detect positions of rotors of the motor and transmit a position signal corresponding to the positions of the rotors to the motor controller;
a bridge circuit to control the rotation direction of the motor; and
a gate circuit controlled by the motor controller to control the bridge circuit, wherein the motor controller controls the gate circuit according to the position signal.

10. A fan driving system, comprising:
a power storage to provide a first direct current voltage; and
a DC electric fan comprising:
 a motor directly driven by the first direct current voltage;
 a fan blade connected to the motor and rotated by the driving of the motor;
 a voltage converter to receive and convert the first direct current voltages to a second direct current voltage, wherein the voltage converting device comprises a voltage sensor, a pulse width modulation control circuit and a switch, the voltage sensor transmits a sensing voltage value to the pulse width modulation control circuit, the pulse width modulation control circuit controls the switch to make the voltage converter output the second direct current voltage according to the sensing voltage value, and the magnitude of the first direct current voltages is larger than the magnitude of the second direct current voltage; and
 a motor controller receiving the second direct current voltages to control a rotation direction of the motor, wherein the motor controller is not powered by the first direct current voltage and the first direct current voltage is a fixed direct current voltage.

11. The fan driving system as claimed in claim 10, wherein the first direct current voltage is larger than 300V.

12. The fan driving system as claimed in claim 10, wherein the first direct current voltage is larger than 300V and smaller than 1000V.

13. The fan driving system as claimed in claim 10, wherein the fan further comprises a position detector to detect positions of rotors of the motor and transmit a position signal corresponding to the positions of the rotors to the motor controller.

14. The fan driving system as claimed in claim 10, wherein the fan further comprises a bridge circuit controlled by the motor controller to control the rotation direction of the motor.

15. The fan driving system as claimed in claim 10, further comprising a positive terminal and a negative terminal to receive the first direct current voltage, and a protection device coupled between the positive terminal and the negative terminal, wherein when the first direct current voltages is larger than a predetermined voltage, the protection device is shut down.

16. The fan driving system as claimed in claim 10, wherein an induced voltage is generated by winds in the motor, the induced voltage is rectified to a direct current charging voltage to charge a battery or power storage connected to the DC electric fan, when the first direct current voltage is not provided to the DC electric fan and a fan driven by the motor is rotated due to nature forces.

17. The fan driving system as claimed in claim 10, wherein the fan further comprises:
a position detector to detect positions of rotors of the motor and transmit a position signal corresponding to the positions of the rotors to the motor controller;
a bridge circuit to control the rotation direction of the motor; and
a gate circuit controlled by the motor controller to control the bridge circuit, wherein the motor controller controls the gate circuit according to the position signal.

* * * * *